US010380908B2

(12) United States Patent
Wong et al.

(10) Patent No.: US 10,380,908 B2
(45) Date of Patent: Aug. 13, 2019

(54) WRITING AID

(71) Applicant: Julielynn Yee-Ching Wong, Toronto (CA)

(72) Inventors: Julielynn Yee-Ching Wong, Toronto (CA); Jody Mou, North York (CA)

(73) Assignee: Medical Makers Inc., Toronto (CA)

( * ) Notice: Subject to any disclaimer, the term of this patent is extended or adjusted under 35 U.S.C. 154(b) by 133 days.

(21) Appl. No.: 15/675,071

(22) Filed: Aug. 11, 2017

(65) Prior Publication Data

US 2018/0047299 A1   Feb. 15, 2018

Related U.S. Application Data

(60) Provisional application No. 62/374,530, filed on Aug. 12, 2016.

(51) Int. Cl.
*G09B 11/02* (2006.01)
*B33Y 80/00* (2015.01)

(52) U.S. Cl.
CPC .............. *G09B 11/02* (2013.01); *B33Y 80/00* (2014.12)

(58) Field of Classification Search
CPC ......... G09B 11/02; B43L 15/00; B43K 23/00; B43K 23/004; B43K 23/008; B43K 23/001; B43K 23/012; B43K 23/016
USPC ................................ 401/6; 15/435, 437, 443
See application file for complete search history.

(56) References Cited

U.S. PATENT DOCUMENTS

| | | | | |
|---|---|---|---|---|
| 42,599 A * | 5/1864 | Rose | ...................... | A45C 11/24 206/37 |
| 78,655 A * | 6/1868 | Eastman | ............... | B43K 23/004 15/443 |
| 338,239 A * | 3/1886 | Wyche | .................... | B43L 15/00 15/437 |
| 744,455 A * | 11/1903 | Alwart | ................. | B43K 23/012 15/227 |
| 884,859 A * | 4/1908 | Rittweger | ............ | B43K 23/004 15/443 |
| 1,122,909 A * | 12/1914 | Graff | ..................... | B43K 23/004 15/443 |
| 1,438,114 A * | 12/1922 | Hume | ..................... | B43L 15/00 15/437 |
| 2,497,418 A | 2/1950 | Schroeder | | |
| 4,035,865 A * | 7/1977 | McRae | .................... | A46B 5/02 16/426 |
| 4,037,975 A * | 7/1977 | Huffman | ................ | B43K 7/005 15/443 |
| 4,111,566 A * | 9/1978 | Kenwell | ................ | B43L 15/00 401/48 |

(Continued)

FOREIGN PATENT DOCUMENTS

KR   10-2017-005433   *  5/2017   ........... B43K 23/008

*Primary Examiner* — Patrick M. Buechner
(74) *Attorney, Agent, or Firm* — Blake, Cassels & Graydon LLP; Brett J. Slaney

(57) ABSTRACT

A writing aid which may be used to promote better form for the hand for the user. It may be used to teach young persons or individuals with disabilities who are first learning to write, and may also be used to provide comfort and better ergonomics to individuals who must write frequently. The writing aid is designed to be compatible with different writing apparatuses with carrying thicknesses, ranging from relatively thin pencil crayons to relatively thick markers.

16 Claims, 10 Drawing Sheets

(56) References Cited

U.S. PATENT DOCUMENTS

| | | | | |
|---|---|---|---|---|
| 4,386,448 A | * | 6/1983 | Kohn | A46B 5/02 |
| | | | | 16/441 |
| D270,945 S | * | 10/1983 | Kohn; Irving | B43K 23/004 |
| | | | | D19/135 |
| 4,523,781 A | * | 6/1985 | Brody | A46B 5/02 |
| | | | | 294/165 |
| 4,917,517 A | | 4/1990 | Ertz | |
| D328,759 S | * | 8/1992 | Pozil | 401/6 |
| 5,180,239 A | | 1/1993 | Bistrack | |
| 5,383,737 A | * | 1/1995 | Urion | B43K 23/004 |
| | | | | 401/48 |
| D809,061 S | * | 1/2018 | Wong | B43K 23/012 |
| | | | | D19/203 |
| 2006/0174448 A1 | * | 8/2006 | You | B43K 23/008 |
| | | | | 16/430 |
| 2008/0025784 A1 | * | 1/2008 | Mueller | B43K 23/004 |
| | | | | 401/34 |
| 2008/0217507 A1 | | 9/2008 | McKenzie | |
| 2011/0164916 A1 | * | 7/2011 | Steeg | A63B 43/00 |
| | | | | 401/195 |
| 2016/0016425 A1 | * | 1/2016 | Huffman | B43K 23/001 |
| | | | | 401/195 |
| 2016/0245455 A1 | * | 8/2016 | Wartersian | A47G 21/02 |

* cited by examiner

WRITING AID

CROSS-REFERENCE TO RELATED APPLICATION

This patent application claims priority to U.S. Patent Application No. 62/374,530, filed on Aug. 12, 2016, and titled "Writing Aid", the contents of which are herein incorporated by reference in their entirety.

TECHNICAL FIELD

The following relates to a writing aid which can be used in conjunction with a writing implement.

DESCRIPTION OF THE RELATED ART

The present invention deals with the field of writing implements (e.g. writing instruments) for facilitating the teaching of persons how to hold writing apparatuses. Non-limiting examples of writing implements include pencils, markers, marking pens, fountain pens, electronic styluses, crayons, chalk, and paint brushes.

Writing aids are used to assist people with learning how to write. Writing aids are also used help people with disabilities or handicaps to improve grip and control of holding the writing implement. For example, some people may have poor muscle control or weak grip and, therefore, cannot steadily hold a pen or pencil when writing. Writing aids may also be used to improve the ergonomic factors of holding and using a writing implement for people with our without disabilities.

BRIEF DESCRIPTION OF THE DRAWINGS

Embodiments will now be described by way of example only with reference to the appended drawings wherein.

DETAILED DESCRIPTION

Figure 1:
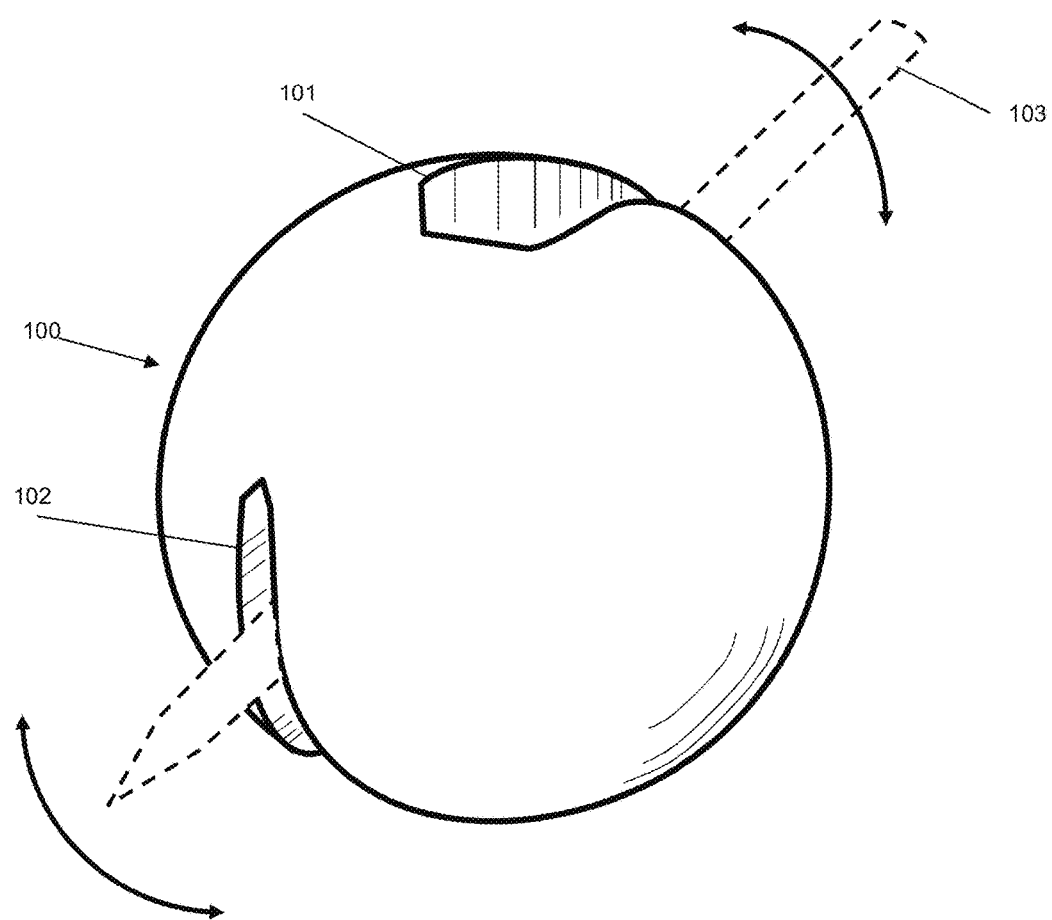
FIG. 1 is a perspective view of an example embodiment of a writing aid shown in conjunction with a writing implement inserted therethrough.
Figure 2:
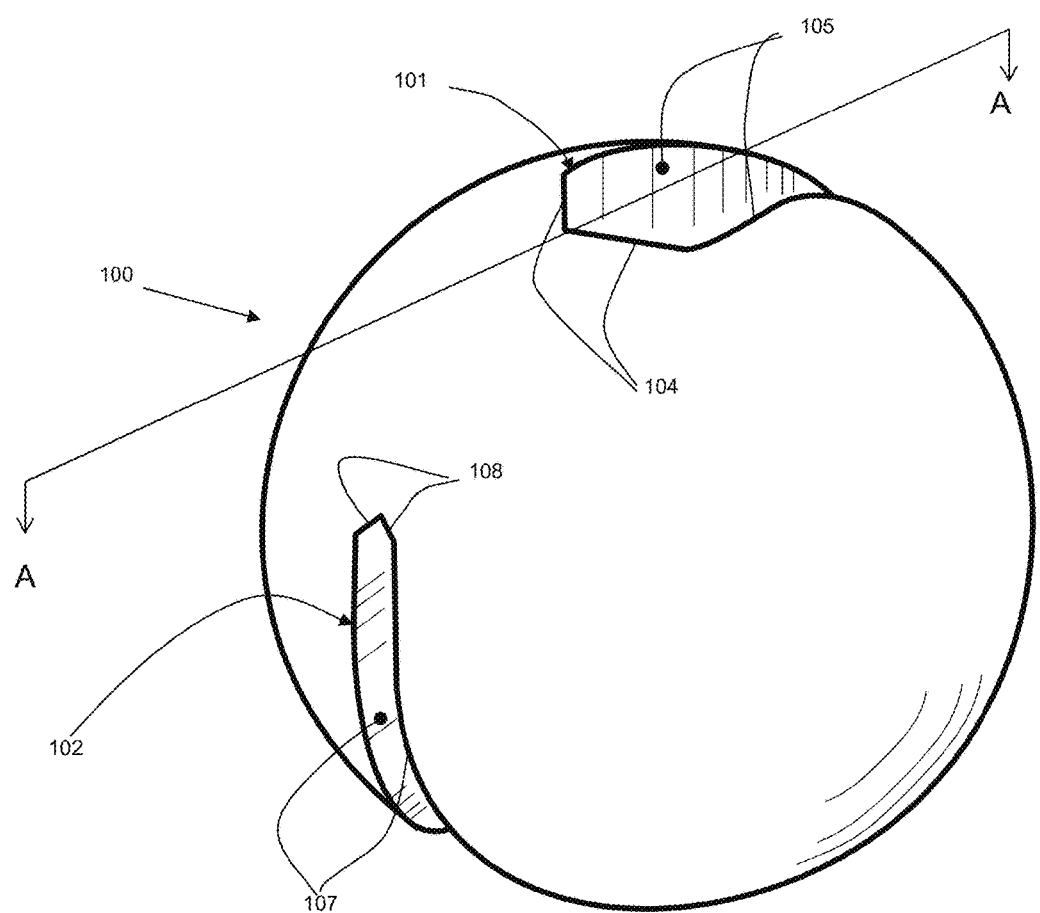
FIG. 2 is a rear perspective view of the writing aid shown in isolation.
Figure 3:
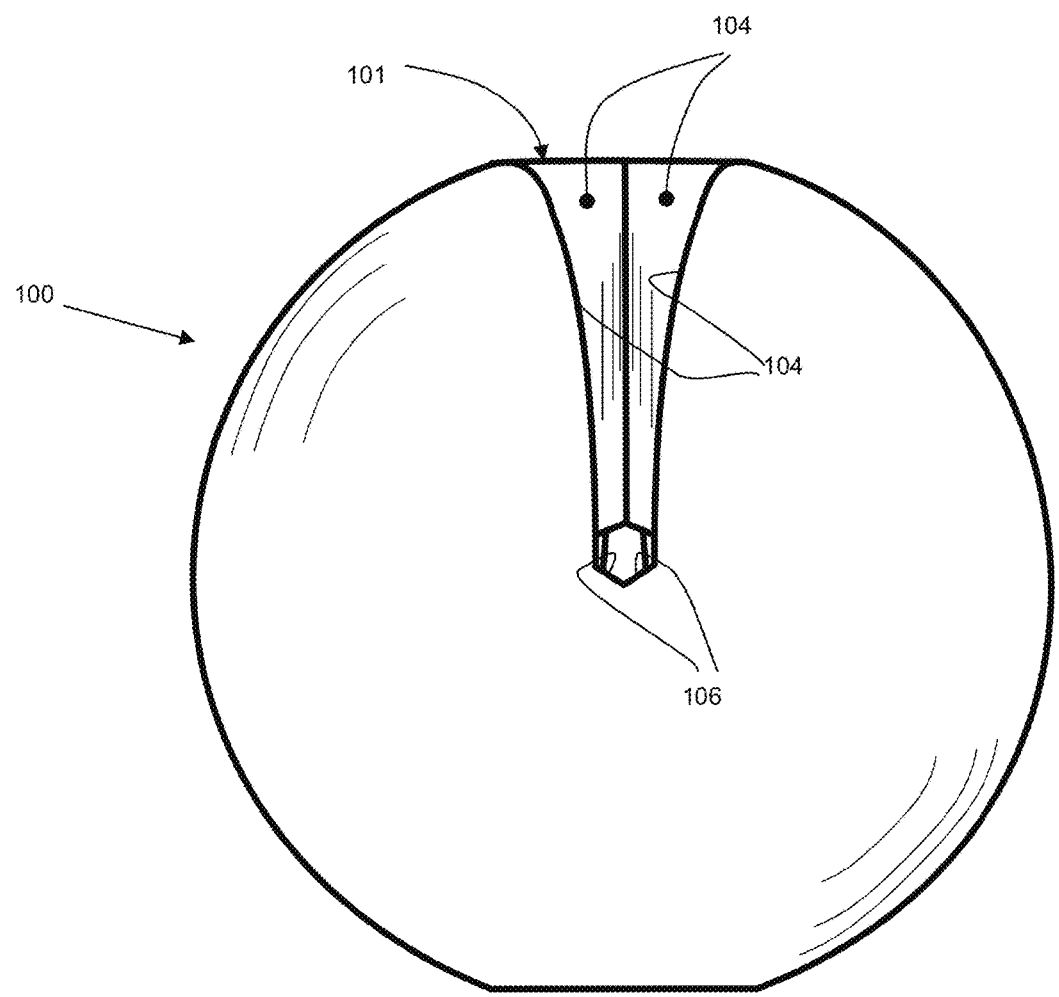
FIG. 3 is front view of the writing aid of FIG. 2
Figure 4:
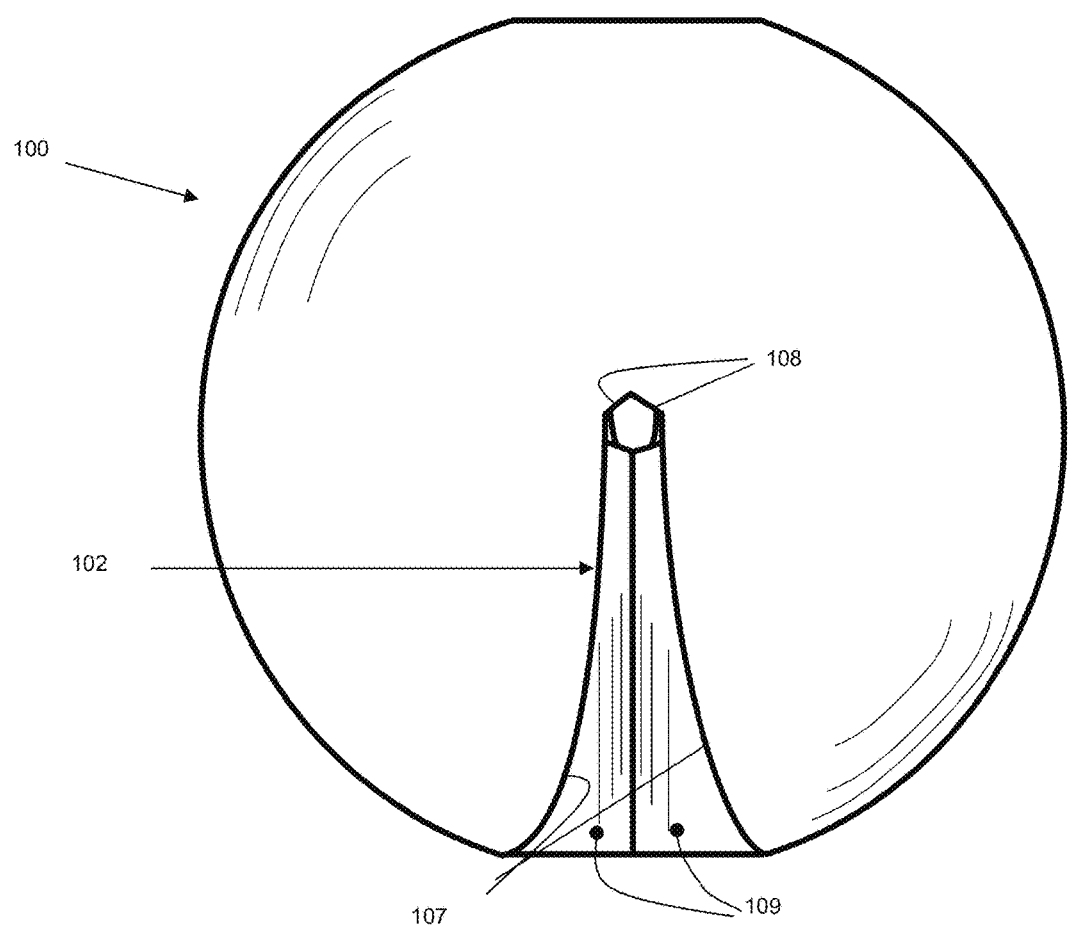
FIG. 4 a rear view of the writing aid of FIG. 2.
Figure 5:
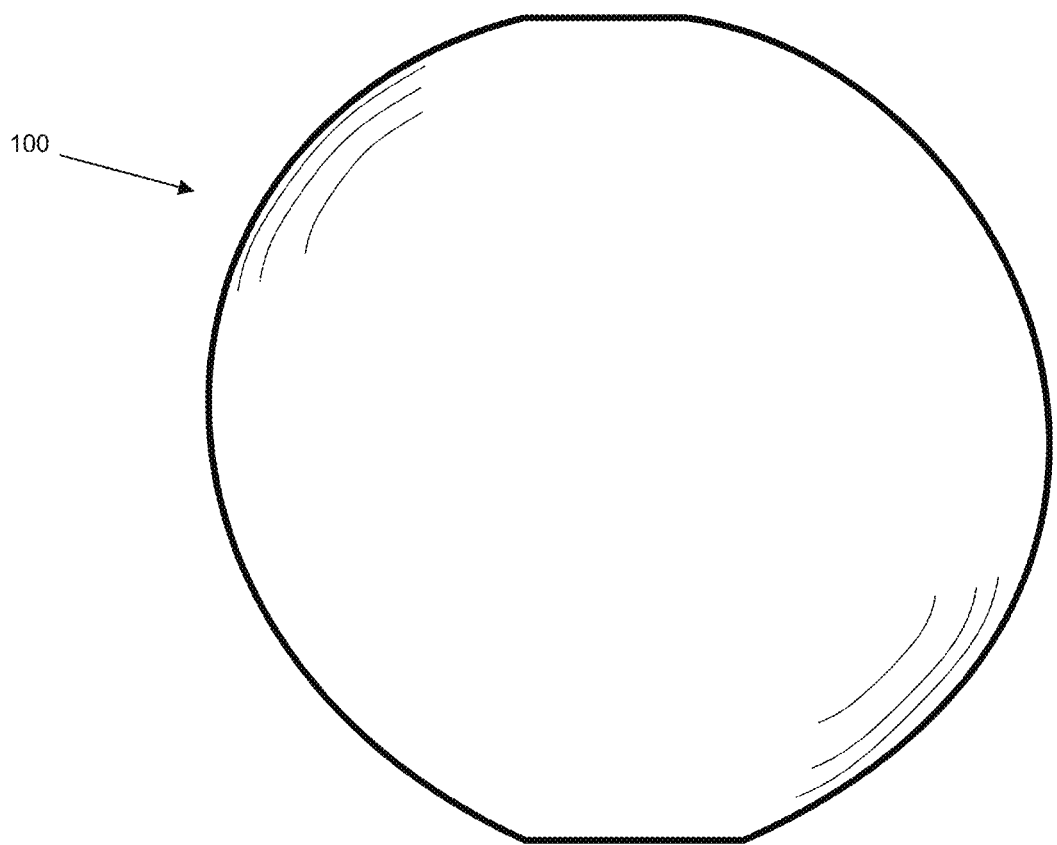
FIG. 5 is a side view of the writing aid of FIG. 2.

It will be appreciated that for simplicity and clarity of illustration, in some cases, reference numerals may be repeated among the figures to indicate corresponding or analogous elements. In addition, some details or features are set forth to provide a thorough understanding of the embodiments described herein. However, it will be understood by those of ordinary skill in the art that the embodiments described herein are illustrative examples that may be practiced without these details or features. In other instances, well-known methods, procedures and components have not been described in detail so as not to obscure the invention illustrated in the examples described herein. Also, the description is not to be considered as limiting the scope of the example embodiments described herein or illustrated in the drawings.

It is herein recognized that writing implements come in various sizes and dimensions. For example, some writing implements have thick barrels, while others have thin barrels. In some cases, one portion of the barrel is skinny, while another portion of the same barrel is thick. For example, some pens have a thicker barrel near the writing tip and then are skinnier at the opposite end. The converse barrel thickness configuration also exists in other examples of pens.

Some existing writing aids are only able to accommodate a certain size of writing implement (e.g. pens or pencils with a certain diameter of the barrel). This can make the use of the writing aid very limited. Or, different sized writing aids are required for different sized writing implements.

U.S. Patent Application Publication No. 2008/0217507 describes a writing aid with an inclined channel that includes a U-shaped spring to accommodate and retain writing implements with various barrel thicknesses. However, the U-shaped spring mechanism only slightly increases the range of barrel thicknesses that the writing aid may accommodate. Furthermore, a person with poor muscle control (also called poor motor control) or low muscle strength may have physical difficulty to place the writing implement into the channel and against the U-shaped spring.

U.S. Pat. No. 5,180,239 describes a writing aid having a circular bore hole to receive a writing implement. The top of the bore hole has flat slits to accommodate different sizes of writing implements, but appears to accommodate different sizes only to a small degree. Furthermore, inserting the writing implement into the circular bore hold will require hand-eye coordination and fine muscle control, which a user may not likely have.

U.S. Pat. No. 2,497,418 describes a writing aid that uses two screws to press against and hold a writing implement in position. A user can turn the screws to accommodate different sized barrels of pens. Using the screws can be troublesome, especially for a person with poor muscle or motor control. U.S. Pat. No. 4,917,517 similarly describes a writing aid that uses a screw to hold a writing implement in place.

It will be appreciated that many existing writing aids are difficult for a person with disability or handicap to use (e.g. to place the writing implement into the writing aid). Furthermore, the above existing writing aids have many components are prone to breakage or malfunction, or both.

The writing aid described herein addresses one or more of the above drawbacks.

In particular, the writing aid described herein is able to accommodate many different sizes of writing implements (e.g. thick markers, skinny pencils, a pen with a varying barrel thickness, stylus pens for computing devices, etc.). The writing aid described herein also makes it easy for a person to insert a writing implement into the writing aid for use. The writing implement is also herein called an elongate writing tool.

FIG. 1 is a perspective view of a writing aid 100, according to an example embodiment. The body of the writing aid 100 has a substantially rounded shape. For example, the body is sphere-like. However, other shapes of the body are applicable, such as polygonal-shaped, ovalshaped, or other shapes. For example, the body of the writing aid may be shaped like an egg, or a cylinder, or may be irregular.

Figure 6:
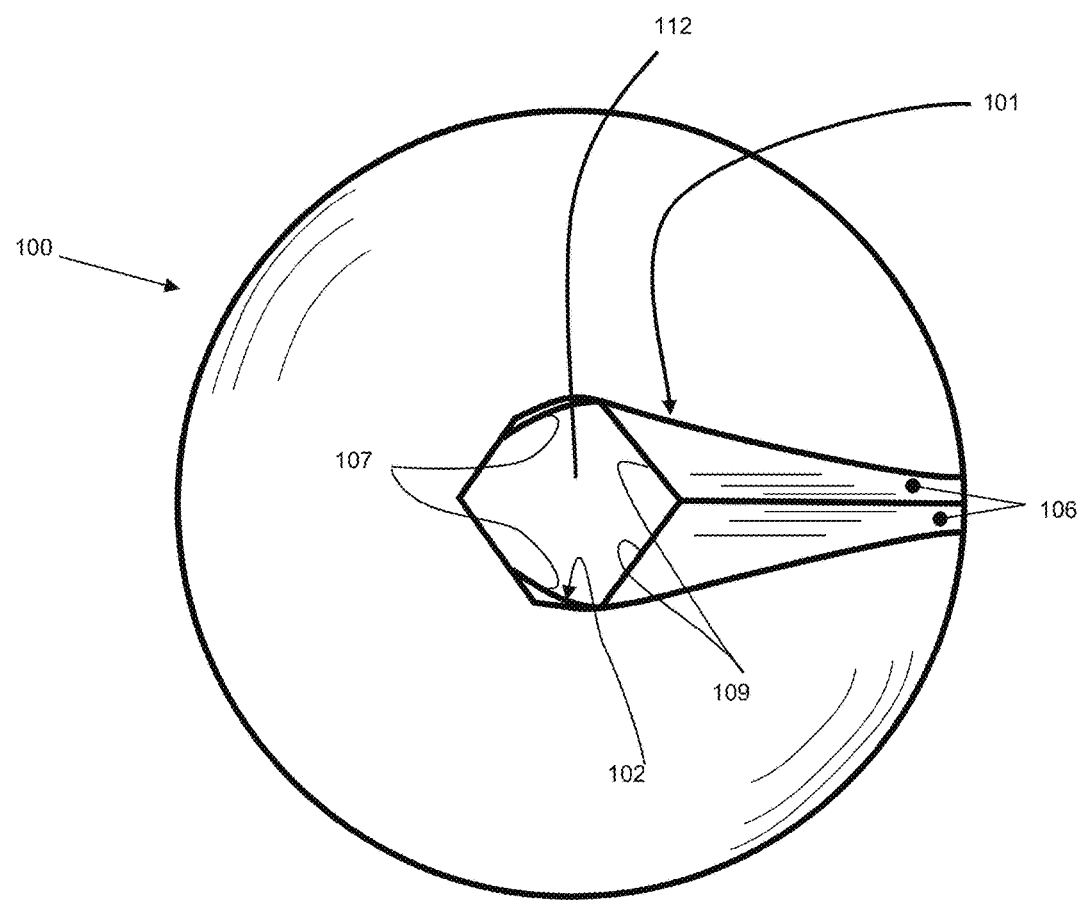
FIG. 6 is a top view of the writing aid of FIG. 2.
Figure 7:
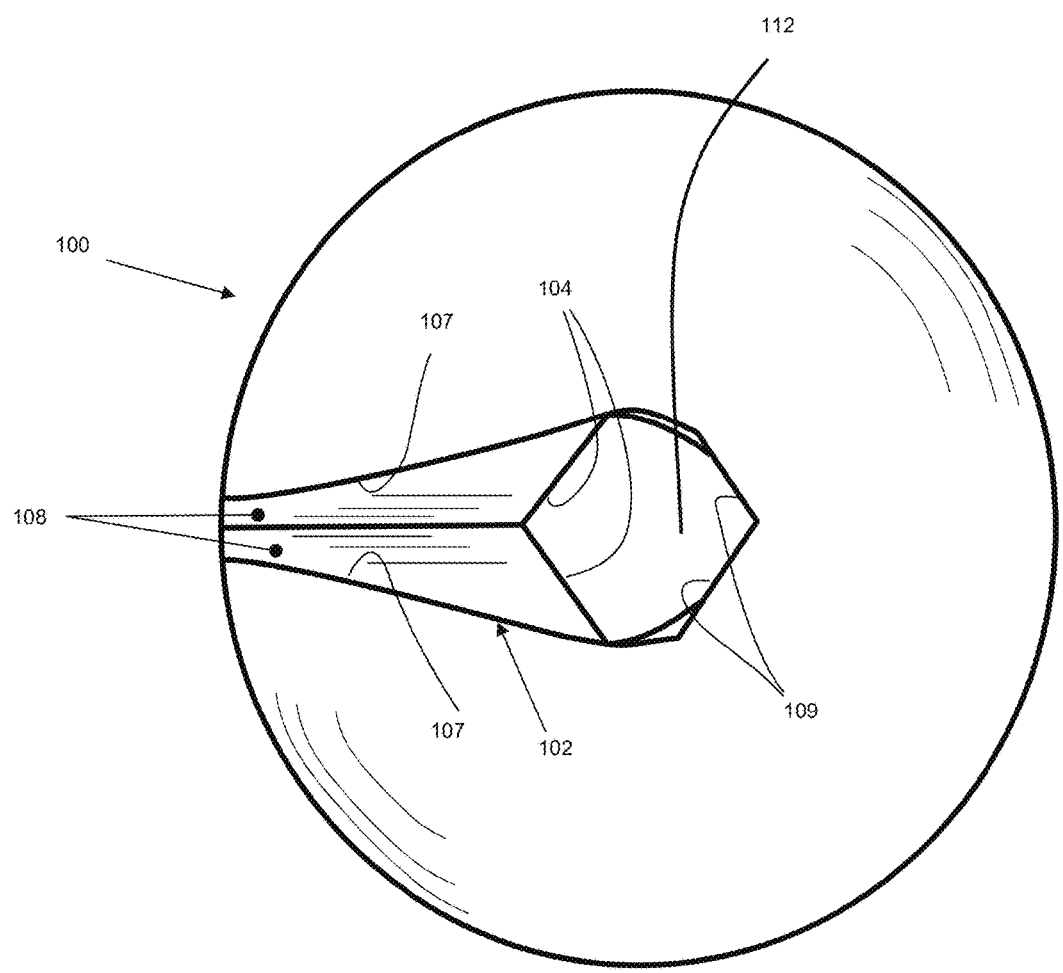
FIG. 7 is a bottom view of the writing aid of FIG. 2.
Figure 8:
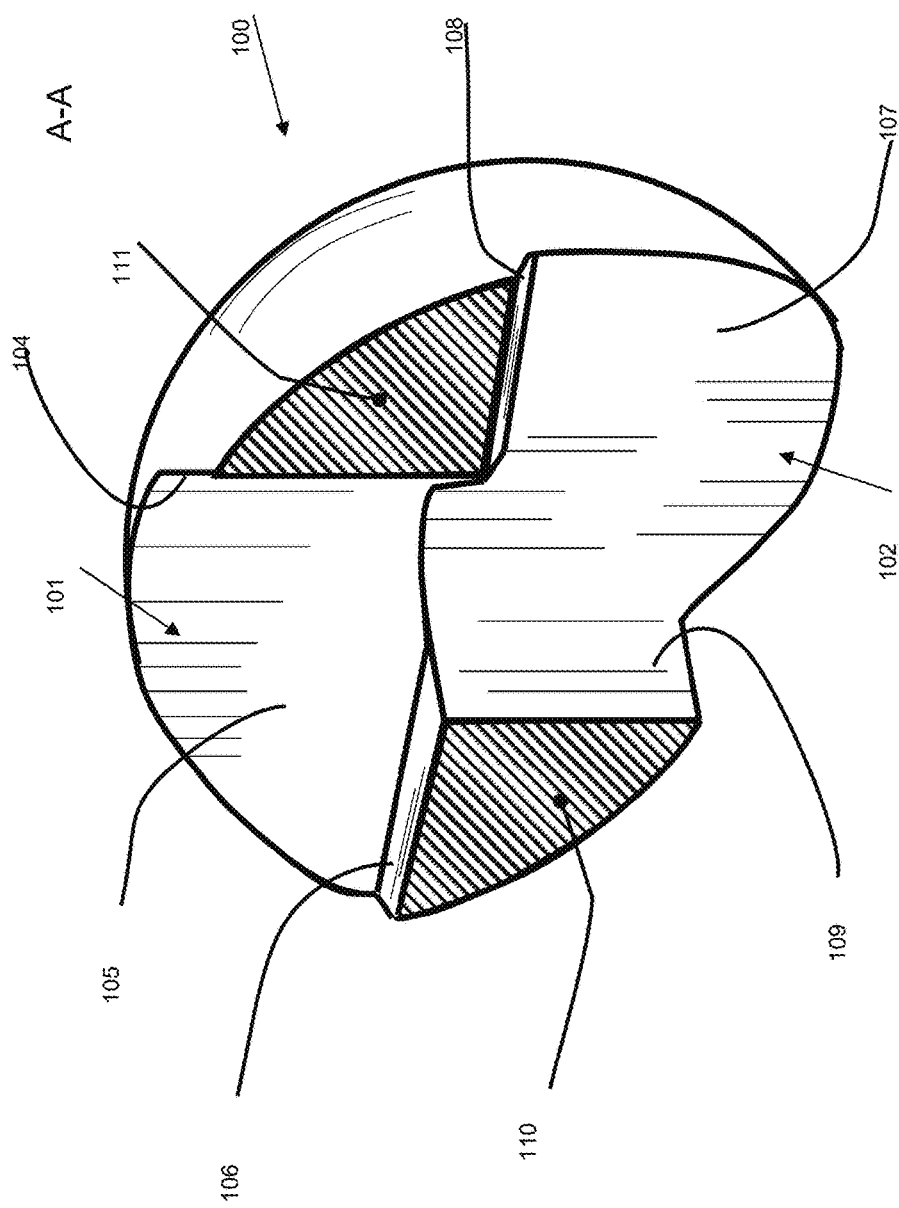
FIG. 8 is a cross-sectional view of the writing aid taken along the lines A-A shown in FIG. 2.

The writing aid defines therein two openings 101, 102 on the outer surface of the body, which are respective positioned on the front and back sides of the writing aid. The openings at the outer surface of the body are not connected to each other. However, as best shown in FIGS. 6, 7 and 8, the openings 101, 102 are connected to each other within the interior of the writing aid, to allow for the writing implement 103 to pass through.

Turning to FIGS. 2-7 show various views of the writing aid 100. FIG. 8 shows a cross-section view of the writing aid along the line A-A shown in FIG. 2.

As shown in the figures, the opening 102 starts out with its widest width at the bottom side (e.g. lower hemisphere) of the writing aid 100 (see FIGS. 7 and 8), and follows the curvature of the writing aid upwards towards the back side, with the opening becoming smaller in width. For example, opening 102 is defined by interior walls 107 that are further apart at the bottom of the writing aid and then grow closer as the walls extend upwards to the back side. The walls 107 are connected by wall or walls 108 at the narrowest point. The location of end wall or walls 108 are positioned, for example, at approximately half the height of the writing aid (e.g. at approximately the equator of the writing aid). At the widest portion, towards and at the bottom of the writing aid, the walls 107 are furthest apart from each other (see FIG. 7). The walls 107 come together or are joined by one or more walls 109. It will be appreciated that the walls 107, 108 and 109 may be one continuous wall surface, or may comprise different planar surfaces.

The opening 101 is similar to the opening 102, but is located on an opposite side of the writing aid. The opening 101 starts out with its widest width at the top side (e.g. upper hemisphere) of the writing aid 100 (see FIGS. 2 and 6), and follows the curvature of the writing aid downwards towards the front side, with the opening becoming smaller in width. For example, opening 101 is defined by interior walls 105 that are further apart at the top of the writing aid and then grow closer as the walls extend downwards to the front side. The walls 105 are connected by wall or walls 106 at the narrowest point. The end wall or walls 106 are located at the front of the writing aid, at approximately half the height of the writing aid (e.g. the equator of the writing aid). At the widest portion, towards and at the top of the writing aid, the walls 105 are furthest apart from each other (see FIGS. 2 and 3). The walls 105 come together or are joined by one or more walls 104, located at the top of the writing aid. It will be appreciated that the walls 104, 105, 106 may be one continuous wall surface, or may comprise different planar surfaces.

As shown in FIGS. 6 and 7, there is a cavity or space 112 that extends from the top to the bottom of the writing aid.

As shown in FIG. 8, in the cross-sectional view, the cut-surfaces 111 and 110 are spaced apart from each other at opposite diagonal positions.

Figure 11:
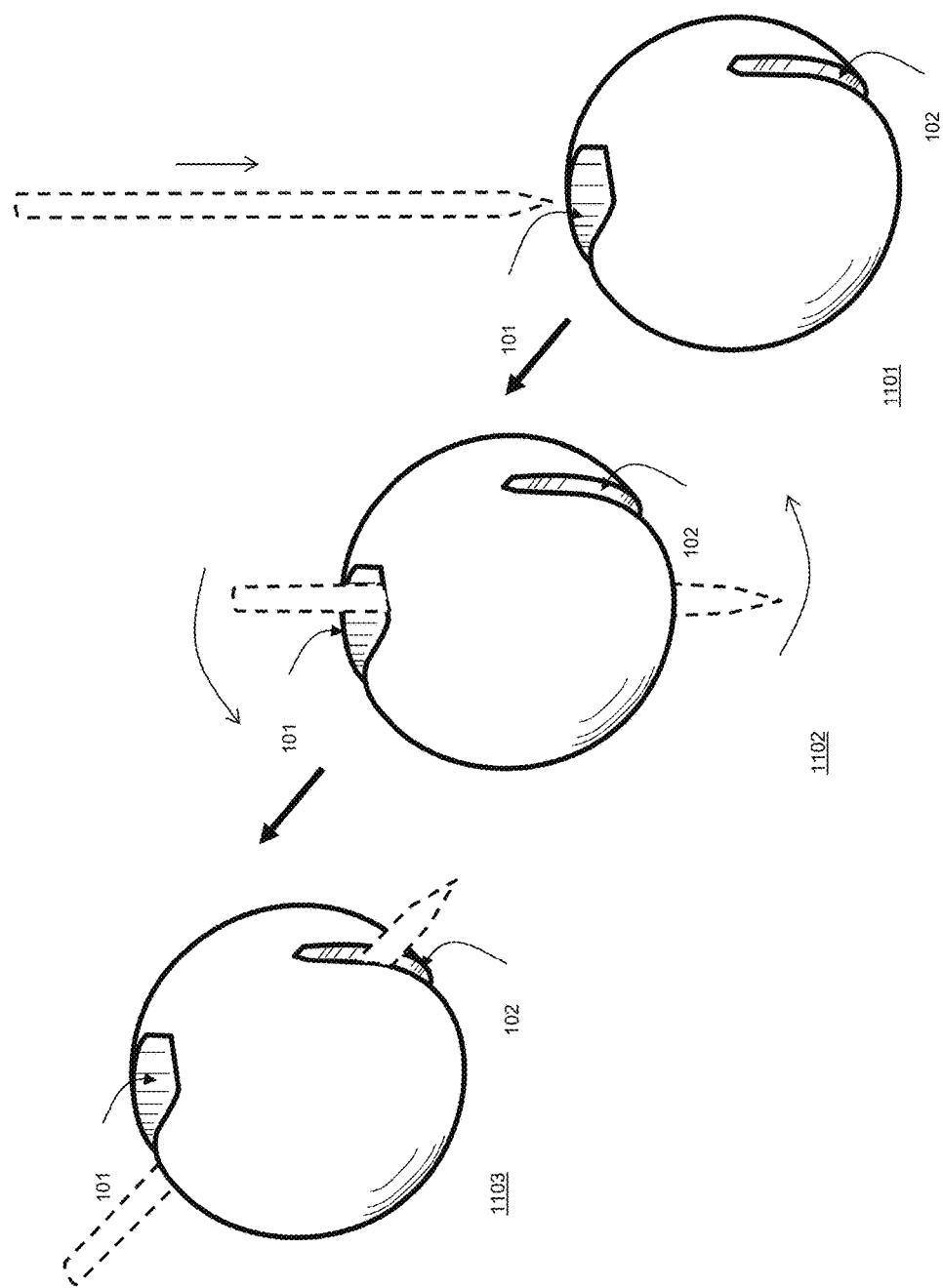
FIG. 11 shows an example of different stages of inserting a writing implement into the writing aid.

As can be seen in FIG. 11, at stage 1101, the writing implement is inserted vertically through the vertical cavity 112 defined within the writing aid. The cavity 112 is at its widest and can accommodate a large range of barrel thicknesses for a given writing aid.

At stage 1102, the writing implement is rotated relative to the writing aid, so that the writing implements moves toward the narrower portions of the openings in the writing aid. For example, the top of the writing implement moves downwards within the opening 101; conversely, the bottom of the writing implement (e.g. the writing tip) moves upwards within the opening 102. In this way, the writing implement is firmly wedged or squeezed by the narrowing walls at two ends. The writing implement stops rotating when it is secured within the writing aid; this is based on a friction fit. The angle or degree of rotation depends on the thickness of the barrel of the writing implement relative to the width of the opening. In this way, different thicknesses of barrels of writing implements may be used in conjunction with the writing aid.

Stage 1103 shows the writing implement secured within the writing aid.

As can be seen, it is very easy for a person, even with poor muscle control, to insert and position the writing implement into the writing aid.

A portion of the writing aid or the entire writing aid is, for example, made from a resilient material such as a thermoplastic, a plastic, or a rubber, or a combination thereof. The writing aid may be relatively rigid but still able to be deformed when pressure is applied, or may be designed to be more flexible and malleable. The writing aid may be made by traditional manufacturing methods or by 3-D printing methods. In a non-limiting example, the writing aid is made from a resilient material under the trade name Ninja Flex.

In an example embodiment, the writing aid is manufactured using 3D printing, and in a further aspect, the preferred infill settings for fused deposition modeling flexible thermoplastic 3D printing of the writing aid is in the range of approximately 20% to 40%.

In another example embodiment, the preferred infill setting for fused deposition modeling flexible thermoplastic 3D printing of the writing aid is approximately 30%.

By way of background, in 3D printing, the term "infill" refers to the structure that is printed inside an object. It is extruded in a designated setting percentage and pattern, which is set in the slicing software. The infill percentage influences the print weight, material usage, strength, and print time. It is herein recognized, that the infill percentage can also affect the resilient deformability of the writing aid.

The resilient material helps to maintain a friction fit to hold the writing implement in place, when wedged between. The resilient material also helps to improve a person's grip of the writing aid.

In an example embodiment, portions of the writing aid may be rigid (e.g. made from hard plastic, wood, metal, etc.), while other portions are formed from the resilient material. The portions around the openings are formed from resilient material to facilitate the wedging of the writing implement.

Figure 9:
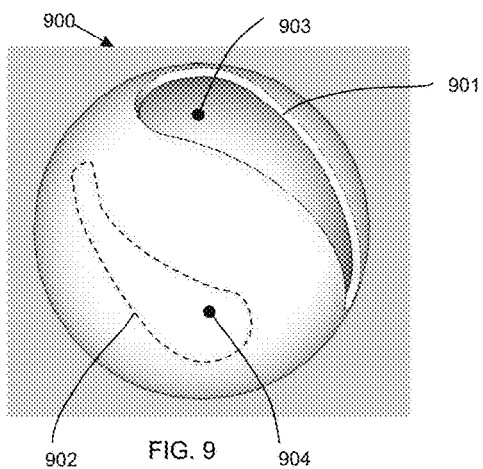
FIG. 9 is a perspective view of another example embodiment of the writing aid.

FIG. 9 shows another example of a writing aid 900 having two openings 903 and 904 respectively defined by walls 901 and 902. This writing aid 900 defines a spherical hollow space therein.

Figure 10B:
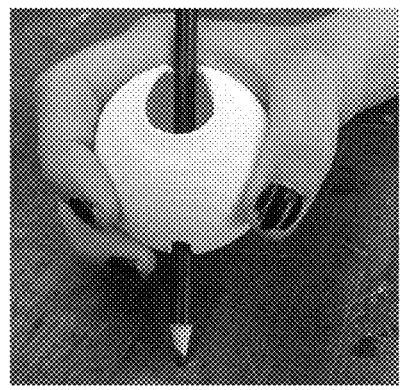
FIG. 10B shows the writing aid in FIG. 10A, but with a pencil placed therethrough.
Figure 10A:
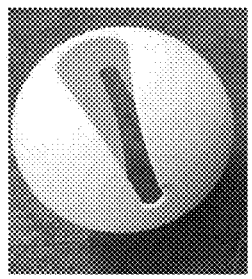
FIG. 10A is another perspective view of the writing aid.

FIGS. 10A and 10B show photographs of the writing aid 900. The writing aid 900 is for example made entirely from a rigid material (e.g. hard plastic).

In another example embodiment, not shown, portions that form the walls 901, 902 of the openings are made from a resilient material.

Below are general example embodiments and aspects of the writing aid.

A writing aid is provided and it comprises a body having a first opening extending through a bottom surface and a front surface of the body. The first opening's widest width is on the bottom surface, and the first opening decreases in width as it travels towards the front surface and ends with its narrowest width on the front surface. The body also comprises a second opening extending through a back surface and a top surface of the body. The second opening's widest width is on the top surface, and decreases in width as it travels towards the back surface and ending with its narrowest width on the back surface. The first opening and the second opening together define a cavity that extends between the top surface and the bottom surface of the body. The cavity is configured to receive an elongate writing tool.

In an example aspect, the body comprises resiliently deformable material. In a further example aspect, the body is 3D printed and the body comprises resilient deformable material. In an further example aspect, the body is 3D printed with an infill setting between a range of 20% and 40%.

In another example aspect, the body comprises a solid material.

In another example aspect, the body comprises a rigid material.

In another example aspect, the body is 3D printed.

In another example aspect, the body defines a hollow space therein.

In another example aspect, the body has a substantially round shape. In a further example aspect, the body has a spherical shape.

In another example embodiment, a method is provided for using the writing aid. The method includes inserting the elongate writing tool into the cavity, and rotating the elongate writing tool relative to the writing aid.

In an example aspect of the method, the rotating of the elongate writing tool causes a bottom end of the writing tool to rotate upwards through the first opening and a top end of the writing tool to rotate downwards through the second opening.

The features described herein are just for example. There may be many variations to these features without departing from the spirit of the invention or inventions. For instance, the features may be added, deleted, or modified.

It will also be appreciated that the features described herein can be combined in different ways to form different embodiments, even though these combinations are not explicitly described, and these different combinations are encompassed by this patent application.

Although the above has been described with reference to certain specific embodiments, various modifications thereof will be apparent to those skilled in the art without departing from the scope of the claims appended hereto.

The invention claimed is:

1. A writing aid comprising:
a body having a first opening extending through a bottom surface and a front surface of the body, with the first opening's widest width being on the bottom surface, decreasing in width as it travels towards the front surface and ending with its narrowest width on the front surface, and a second opening extending through a back surface and a top surface of the body, with the second opening's widest width being on the top surface, decreasing in width as it travels towards the back surface and ending with its narrowest width on the back surface, and the first opening and the second opening together define a cavity that extends between the top surface and the bottom surface, and the cavity is configured to receive an elongate writing tool.

2. The writing aid of claim 1, wherein the body comprises resiliently deformable material.

3. The writing aid of claim 2, wherein the body is 3D printed.

4. The writing aid of claim 3, wherein the body comprises an infill setting between a range of 20% and 40%.

5. The writing aid of claim 4, wherein the infill setting is 30%.

6. The writing aid of claim 1, wherein the body comprises a solid material.

7. The writing aid of claim 1, wherein the body comprises a solid material that is resiliently deformable.

8. The writing aid of claim 1, wherein the body comprises a rigid material.

9. The writing aid of claim 1, wherein the body is 3D printed.

10. The writing aid of claim 1, wherein the body defines a hollow space therein.

11. The writing aid of claim 1, wherein the body comprises a rigid material and defines a hollow space therein.

12. The writing aid of claim 1, wherein the body has a substantially round shape.

13. The writing aid of claim 12, wherein the body has a spherical shape.

14. The writing aid of claim 1, wherein the body has an irregular shape.

15. A method of using a writing aid, comprising:
providing a writing aid, which comprises a body having a first opening extending through a bottom surface and a front surface of the body, with the first opening's widest width being on the bottom surface, decreasing in width as it travels towards the front surface and ending with its narrowest width on the front surface, and a second opening extending through a back surface and a top surface of the body, with the second opening's widest width being on the top surface, decreasing in width as it travels towards the back surface and ending with its narrowest width on the back surface, and the first opening and the second opening together define a cavity that extends between the top surface and the bottom surface, and the cavity is configured to receive an elongate writing tool, inserting the elongate writing tool into the cavity, and
rotating the elongate writing tool relative to the writing aid.

16. The method of claim 15 wherein, the rotating of the elongate writing tool causes a bottom end of the writing tool to rotate upwards through the first opening and a top end of the writing tool to rotate downwards through the second opening.

* * * * *